United States Patent [19]

Strolle

[11] 4,215,023

[45] Jul. 29, 1980

[54] URETHANE ENAMEL COATING COMPOSITION

[75] Inventor: Clifford H. Strolle, Springfield, Pa.

[73] Assignee: E. I. Du Pont de Nemours and Company, Wilmington, Del.

[21] Appl. No.: 960,014

[22] Filed: Nov. 13, 1978

[51] Int. Cl.$^2$ ............................................. C08L 91/00
[52] U.S. Cl. ................................. 260/22 CB; 525/123
[58] Field of Search ..................................... 260/22 CB

[56] References Cited

U.S. PATENT DOCUMENTS

| | | | |
|---|---|---|---|
| 3,245,941 | 4/1966 | Mayer et al. | 260/31.6 |
| 3,558,564 | 1/1971 | Vostal | 528/58 |
| 3,844,993 | 10/1974 | Miller | 260/22 CB |
| 3,998,768 | 12/1976 | Pettit, Jr. | 526/320 |
| 4,051,165 | 9/1977 | Wagner | 260/453 |

*Primary Examiner*—Joseph L. Schofer
*Assistant Examiner*—Peter F. Kulkosky

[57] ABSTRACT

A thermosetting coating composition of a urethane polymer has film-forming constituents of an organic polyisocyanate, a polymer of polymerized ethylenically unsaturated monomer units which contains pendant hydroxyl-containing groups, and a hydroxyl-containing alkyd plasticizer. The composition can be applied at industrially-acceptable cure temperatures and volume-solids levels to form a durable film.

13 Claims, No Drawings

URETHANE ENAMEL COATING COMPOSITION

BACKGROUND OF THE INVENTION

1. Field Of The Invention

This invention relates to a polyurethane film-forming composition of a polyisocyanate, a polymer having pendent hydroxyl-containing groups, and a reactive plasticizer.

2. Description Of The Prior Art

Polyurethane compositions are conventionally used as coatings, adhesives and molding materials. The inclusion in these compositions of a hydroxyl-containing polymer and a polyisocyanate is shown, for example, by U.S. Pat. No. 3,245,941 issued Apr. 12, 1966 to Mayer, et al. Such compositions are useful as coatings and the like but do not provide the durability and flexibility required for industrial finishes.

U.S. Pat. No. 3,558,564 issued Jan. 26, 1971 to Vasta shows a polyurethane coating of a polyisocyanate and a hydroxyl-containing polymer which satisfies these requirements. The hydroxyl groups shown in this patent are contained in ester groups attached directly to the polymer backbone, the ester groups being formed by reacting a hydroxyalkyl monomer, an anhydride of a dicarboxylic acid, and a glycidyl ester. These ester groups give the coating excellent flexibility but add to the molecular weight of the polymer, making it difficult to apply by spraying at high volume-solids, above 50%.

With the current emphasis on reduced solvent emissions and lower energy consumption, there remains a need for a polyurethane coating which not only can be spray-applied at high volume-solids but also can be cured at ambient temperatures to form a durable, flexible finish.

SUMMARY OF THE INVENTION

There is provided by the present invention, a thermosetting coating composition of a mixture of a polymer blend and a solvent for the polymer blend where the blend is 10–70% by volume of the mixture and consists essentially of (1) 15–50% by weight, based on the weight of the blend, of an organic polyisocyanate;

(2) 10–70% by weight, based on the weight of the blend, of a polymer having a backbone of polymerized ethylenically unsaturated monomers and polymerized ethylenically unsaturated ester units that form ester groups of the formula

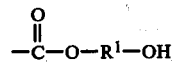

attached directly to the backbone wherein $R^1$ is a saturated hydrocarbon radical having 2–10 carbon atoms and wherein the primary-hydroxyl content of the polymer is 0.5–4% by weight; and (3) 15–40% by weight, based on the weight of the blend, of an alkyd resin plasticizer which is the reaction product of a glyceride of a fatty acid, a dihydric alcohol, and a derivative of a dicarboxylic acid selected from the group consisting of anhydrides, dialkyl esters, and mixtures of these, wherein the reaction product has a primary-hydroxyl content of 1.0–4.4% by weight.

DETAILED DESCRIPTION OF THE INVENTION

The film-forming portion of the coating composition of the present invention is a polymer blend of an organic polyisocyanate, a polymer containing pendant hydroxyl-containing ester units, and a hydroxyl-containing alkyd resin as a reactive plasticizer. Optionally, a reaction catalyst can be included in the composition to decrease the curing time.

The organic polyisocyanates that can be used in the present invention make up 15–50%, preferably 25–40%, by weight of the film-forming blend. These include aliphatic, cycloaliphatic, alkaryl, aralkyl, heterocyclic, and aryl di- or triisocyanates. Oligomers of these can also be used.

Typically useful polyisocyanates are, for example,
diphenylmethane-4,4'-diisocyanate,
diphenylene-4,4'-diisocyanate,
toluene-2,4-diisocyanate,
toluene-2,6-diisocyanate,
3,3'-dimethoxy-4,4'-diphenylene diisocyanate
methylene-bis-(4-cyclohexyl isocyanate)
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2diisocyanate,
m-phenylene diisocyanate,
p-phenylene diisocyanate,
1,5-naphthalene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyante,
4,4'-biphenylene diisocyanate,
3,3'-dichloro-4,4'-biphenylene diisocyanate,
furfurylidene diisocyanate,
bis-(2-isocyanatoethyl)fumarate,
1,3,5-benzene triisocyanate,
para,para',para"-triphenylmethane triisocyanate,
3,3'-diisocyanatodipropyl ether,
xylylene diisocyanate,
$\beta,\beta$-diphenyl propane-4,4'-diisocyanate, and
isophorone diisocyanate Preferred among these are hexamethylene diisocyanate, methylene-bis-(4-cyclohexyl isocyanate), and isophorone diisocyanate. Particularly preferred polyisocyanates are biurets of the formula

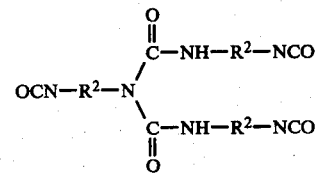

where $R^2$ is an aliphatic or aromatic hydrocarbon group having 1–12 carbon atoms. These biurets can be made according to Wagner et al. U.S. Pat. No. 4,015,165, issued Sept. 27, 1977. In a most preferred biuret, $R^2$ is $-(CH_2)_6-$. This biuret is a trimer of hexamethylene diisocyanate (HMDI), which is obtained by reacting three moles of HMDI with one mole of water.

The hydroxyl-containing polymer used in the present invention is prepared by co-polymerizing ethylenically-unsaturated monomers, to form part of the polymer backbone, with monomer units of hydroxyalkyl esters of ethylenically-unsaturated carboxylic acids. The polymer constitutes 10–70%, preferably 30–60%, by weight of the film-forming blend.

Ethylenically-unsaturated monomers that can be used in the polymer backbone are conventionally known and available. Specific examples are vinyl chloride, vinylidene chloride, olefins, such as ethylene, propylene and the like; vinyl acetate, conjugated dienes having 4 to 10 carbon atoms, such as butadiene; aromatic hydrocarbons having vinylene groups, such as styrene, alkyl substituted styrene, such as α-methyl styrene; alkyl maleate, such as dibutyl maleate; vinyl pyrrolidone; esters of methacrylic acid and acrylic acid, preferably alkyl esters having 1–12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like or mixtures of these monomers. Small amounts of ethylenically unsaturated carboxylic acids can also be used in the backbone, such as acrylic acid, methacrylic acid, crotonic acid, itaconic acid, maleic acid and the like.

The hydroxyalkyl esters used in the present invention are co-polymerized with the above-mentioned backbone monomers to give ester groups, attached directly to the backbone, of the formula

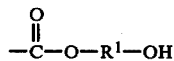

wherein $R^1$ is a saturated hydrocarbon radical having 2–10 carbon atoms. Acids from which these esters are derived can be any ethylenically unsaturated mono or dicarboxylic acid such as acrylic, methacrylic, maleic, itaconic, crotonic, or other similar acids.

Preferred hydroxyalkyl ester monomers are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, and hydroxyoctyl acrylate. Most preferred are hydroxyalkyl methacrylates and acrylates in which the hydroxyl group is primary and the alkyl group has 2–4 carbon atoms.

The co-polymerization of the monomeric constitutents is preferably accomplished in an inert organic solvent in the presence of a free-radical forming initiator of the peroxide or azo type. Typical solvents are aromatics, esters, ethers, ketones, and the like. Examples are benzene, toluene, xylene, butyl acetate, ethylene glycol monoethyl ether acetate, acetone, methylisobutyl ketone, and methylethyl ketone. Useful initiators are, for example, benzoyl peroxide, lauroyl peroxide, ditertiary butyl peroxide, cumene hydroperoxide, and azoisobutyric acid dinitrile. Conventional polymerization temperatures, based on reflux, are used, preferably in the range of 50° C. to about 200° C. The reaction is carried out to the point that the polymer has a number average molecular weight (as determined by gel permeation chromatography having polystyrene standards) of 3000 to 14000 preferably 4500 to 10000. It is preferred that the primary-hydroxyl content of the resultant polymer be from about 0.5–4.4% by weight, with a range of 1.0–3.0% being most preferred.

Although any combination of the above-mentioned monomers and esters can be copolymerized to form polymers useful in the present invention. A preferred polymer consists essentially of monomer units of methyl methacrylate, 25–40% by weight; styrene, 40–60% by weight; and hydroxyethyl acrylate, 10–30% by weight.

The plasticizer used in the present invention is an alkyd resin that is 15–40% by weight, preferably 20–30% by weight of the film-forming polymer blend. The plasticizer is the reaction product of a glyceride of a fatty acid, a dihydric alcohol, and a derivative of a dicarboxylic acid wherein the derivative is an anhydride, a dialkyl ester, or a mixture of these.

The above-mentioned glycerides have the general formula

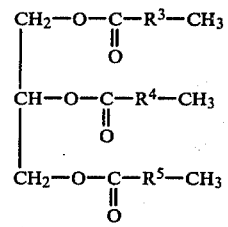

wherein $R^3$, $R^4$ and $R^5$ are the same or different straight-chain hydrocarbon groups, ranging in size from 8 to 16 carbon atoms. Each of the groups can be alkylene or can contain one or more double bonds.

The glycerides are structurally considered to be the condensation product of a molecule of glycerol and three molecules of the same or different fatty acids. For example, useful glycerides are found in coconut oil, castor oil, cottonseed oil, peanut oil, tung oil, linseed oil, soya oil, and dehydrated castor oil. Preferred glycerides are derived from one or more of the saturated fatty acids such as capric, lauric, myristic, palmitic, and stearic acids. An oil in which these preferred glycerides predominate is coconut oil.

The anhydrides and dialkyl esters useful in the formation of the plasticizer are derived from dicarboxylic acids of the general formula

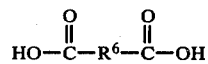

wherein $R^6$ is either alkylene, vinylene, aromatic, carbocyclic, or heterocyclic.

Preferred acids when $R^6$ is alkylene are those in which $R^6$ has 2–10 carbon atoms. Examples are glutaric, adipic, pimelic, and succinic acids. Most preferred of this group is succinic acid. When $R^6$ is vinylene, the most useful acids are those in which $R^6$ has 2–8 carbon atoms. Typical acids of this group are maleic and itaconic acids.

Dibasic aromatic acids, such as phthalic, uritic, and cumidinic acids, are also useful to form anhydrides and dialkyl esters. Useful acids when $R^6$ is carbocyclic are, for example, hexahydrophthalic acid and tetrahydrophthalic acid.

The alkyl groups of the dialkyl esters can be the same or different hydrocarbon radicals having 1–8 carbon atoms. The groups can be primary, secondary, or tertiary. Terephthalic, maleic, and succinic acids are preferred in the formation of these di-esters. A most preferred di-ester is dimethyl terephthalate. Preferred anhydrides are phthalic, maleic, and succinic anhydride.

A dihydric alcohol is the third constituent of the plasticizer. Typical of useful alcohols are ethylene glycol; propylene glycol; 1-3 propanediol; 1,2 butanediol; meso-2,3 butanediol; and 1,4 butanediol. Preferred are those dihydric alcohols in which both hydroxyl groups are primary.

As a typical example of the formation of the plasticizer, the glyceride, dihydric alcohol, and a suitable solvent are charged into a reaction vessel and heated for 30 minutes to 2 hours at 100° C.-200° C. The solvent can be any of those described above in the production of the hydroxyl-containing polymer. The dicarboxylic acid derivative is then added slowly over a 1-4 hour period. The reaction mixture is heated to its reflux temperature, 100° C.-300° C., and maintained at reflux for about 30 minutes to 4 hours, until the product has a number average molecular weight (determined by gel permeation chromatography based on polystyrene standards) of 800-1600, perferably 900-1200. The reactants should be chosen so that the product, the plasticizer, has a primary-hydroxyl content of 1.0-4.4% by weight, preferably 2.0-4.0% by weight.

The hydroxyl-containing polymer and the plasticizer, formed as described above, are each in solution and are suitable for direct use to form the coating composition of this invention by blending with each other and with a solution of the polyisocyanate. In practice, a two component system can be used, that is, a solution of polyisocyanate is in one package, and a solution of the hydroxyl-containing polymer and plasticizer is in a separate package. The two solutions are thoroughly mixed just before applying the coating composition. Separation of the two solutions is usually necessary since the "pot life" of the composition is short—the polyisocyanate reacts with the hydroxyl groups of the polymer and plasticizer at a rapid rate, even at room temperatures.

Regardless of the method by which the final coating composition is mixed, the composition contains 10-70% by volume of the polymer blend (the hydroxyl-containing polymer, the plasticizer, and the polyisocyanate) and a solvent for the blend. One of the useful aspects of the present invention is that it can be conveniently spray-applied even at high volume-solids levels. The solvent of the final composition can be a mixture of the organic solvents in which the constituents of the polymer blend are each formed.

The coating composition of this invention may contain about 0.01-2.0% by weight, based on the weight of the polymer blend, of a curing catalyst. The catalysts are usually organo metallics such as dibutyl tin dilaurate and zinc octoate, which are preferred, dibutyl tin di-2-ethylhexoate, stannous octoate, stannous oleate, zinc naphthenate, vanadium acetyl acetonate, and zirconium acetyl acetonate. Also useful as catalysts are tertiary amines, such as, for example, triethylene diamine, heptamethylisobiguanide, triethylamine,pyridine,dimethylaniline, and methyl morpholine. When a two-component system is used, the catalyst can be added to either the polyisocyanate solution or the solution of the hydroxyl-containing polymer and the plasticizer.

Instead of the two-component "two-package", system described above, a "one package" coating composition can be prepared if the reactive groups of the polyisocyanate are blocked with a blocking agent such as methyl ethyl ketoxime. This eliminates the need for keeping the hydroxyl-containing polymer and plasticizer apart from the polyisocyanate until just before use. When the coating composition, with the blocked polyisocyanate, is applied and heated to 150°-160° C., the blocking agent is released, permitting the polyisocyanate to react with the polymer and plasticizer.

To provide the novel coating composition with other characteristics that may be desirable under some conditions, other compatible polymers may be blended with the coating composition, such as polymethyl methacrylate, polystyrene, polyvinylpyrrolidone and the like. For example, 20-40% by weight, based on the weight of the polymer blend, of polymethyl methacrylate decreases the drying time and enhances the gloss and appearance of the dried coating.

The coating composition of the invention can be pigmented, containing an amount of pigment in a pigment/polymer-blend weight ratio of about 0.2/1 to 100/1. Useful pigments are, for example, metallic oxides, such as titanium dioxide or zinc oxide; metal hydroxides; metal flakes; sulfides; sulfates; carbonates; carbon black; silica; talc; china clay; and organic dyes.

The pigments can be introduced into the coating composition by first forming a mill base with the hydroxyl-containing polymer. The mill base can be formed, for example, by conventional sand-grinding or ball-milling techniques, and then can be blended, by simple stirring or agitation, with the other constituents of the coating composition.

The coating composition of this invention can be applied to a variety of substrates by any of the conventional application methods such as spraying, dipping, brushing, or flow coating. Substrates that can be advantageously coated with the present composition are, for example, metal, steel, wood, glass, or plastics such as polypropylene, polystyrene, copolymers of styrene, and the like. The coating is particularly suited for application over primed or unprimed metal or steel. Typical uses are for coating steel that has been treated with zinc phosphate, metal substrates pre-coated with conventional alkyd or epoxy primers, and galvanized steel.

The coating can be air-dried or can be dried by heating at 50°-120° C. for 15 minutes to two hours. As noted, however, if the coating contains a blocked polyisocyanate, temperatures of 150°-160° C. are necessary. When air-dried, the coating is tack-free after two hours, and has a knoop hardness of 1.5 and pencil hardness of H after 4 days. As further drying occurs, hardness progresses advantageously, and the composition finally dries to a coating that can be polished by conventional techniques to improve further the gloss or appearance. The dried coating is hard, durable, scratch and stain resistant, and weather resistant. It is suitable, for example, for coating automobile or truck bodies, railroad equipment, appliances, and any outdoor equipment.

The following example illustrates the best mode of the invention.

EXAMPLE

The following 3 ingredients are prepared as follows:

| 1. Polymer solution | |
|---|---|
| | Parts by Weight |
| Portion 1 | |
| Ethylene Glycol monoethyl ether | 1280 |

| 1. Polymer solution | |
|---|---|
| | Parts by Weight |
| acetate | |
| Portion 2 | |
| Styrene | 880 |
| Methyl methacrylate | 502 |
| Hydroxyethyl acrylate | 188 |
| Ditertiary butyl peroxide | 31.4 |
| | 1601.4 |

Portion 1 is charged into a reaction vessel and heated to reflux, approximately 145° C. Reflux is maintained for one hour, after which time Portion 2 is added, with mixing, over a four-hour period. The mixture is maintained at reflux during this period and for an additional two hours thereafter. The resulting polymer has a primary-hydroxyl content of 1.8% by weight (based on polymer weight) and a number average molecular weight (gel permeation chromatography) of 5500. The polymer solution has a Gardner-Holdt viscosity of X and a solids content of 55% by volume.

| 2. Mill Base | |
|---|---|
| | Parts By Weight |
| Polymer solution (ingredient 1) | 22.0 |
| Methylethyl ketone | 12.0 |
| TiO$_2$ white pigment | 66.0 |
| | 100.0 |

The above constituents are added into a porcelain mill containing 3 quarts of pebbles and ground for 72 hours.

| 3. Plasticizer solution | |
|---|---|
| | Parts By Weight |
| Portion 1 | |
| Coconut Oil | 272.32 |
| Ethylene glycol | 189.49 |
| Lead Tallate | 0.18 |
| | 461.99 |
| Portion 2 | |
| Toluene | 138.86 |
| Portion 3 | |
| Phthalic anhydride | 366.19 |

Portion 1 is charged into a reaction vessel equipped with an agitatior and reflux condenser and heated quickly to 182° C. This temperature is maintained for one hour after which about 25% of Portion 2 is slowly added, maintaining temperature and mixing throughout. Portion 3 is then added slowly, with mixing, while heating is increased until the temperature reaches 220° C. The reaction is allowed to continue at this temperature, maintaining sufficient reflux to give a vessel pressure (guage) of 1–2 inches mercury, until the acid number (100% solids basis) is 6–8. Heating is stopped, and the remainder of Portion 2 is added. The mixture is agitated for one hour and then filtered. The resulting reaction product, the plasticizer, has a primary-hydroxyl content of 2.2% by weight (based on product solids weight) and a number average molecular weight (gel permeation chromatography) of 1000. The plasticizer solution has a Gardner Holdt viscosity of S-W and a solids content of 85% by volume.

A coating composition is then prepared with the following constituents:

| | Parts By Weight |
|---|---|
| Polymer solution (ingredient 1) | 55.15 |
| Mill base (ingredient 2) | 121.21 |
| Plasticizer solution (ingredient 3) | 35.29 |
| Polyisocyanate (trimer of hexamethylene diisocyanate, 75% weight-solids in ethylene glycol monoethyl ether acetate) | 33.33 |
| Dibutyl tin dilaurate (0.2% weight in ethyl acetate) | 3.67 |

The above constituents are charged into a stainless steel vessel and thoroughly mixed, giving a coating composition of non-volatile solids in solvent wherein the solids are 60% by volume of the composition.

The coating composition is sprayed (airless spray using a pressure of 2500 pounds per square inch) onto polished steel panels that had been primed with an epoxy-based primer, and the coated panels are allowed to air-dry. When tested thirteen days after spraying, the coating has a Knoop hardness of 2.57 and a gloss, measured at 20°, of 95. There is negligible gloss loss after 3-month, horizontal, Florida exposure. Adhesion of the coating to the primer is excellent as determined by knifescratching the coating to separate it from the primer.

A one-molar solution of each of ammonium hydroxide, hydrochloric acid, sulfuric acid, acetic acid, and sodium hydroxide is prepared. A panel, coated as above, is placed in contact with each solution for 16 hours. No staining of the coating occurs in any case.

I claim:
1. A curable coating composition comprising 10–70% by volume of a polymer blend and a solvent for the polymer blend wherein the polymer blend consists essentially of:
 (a) 15–50% by weight, based on the weight of the blend, of an organic polyisocyanate;
 (b) 10–70% by weight, based on the weight of the blend, of a polymer having a backbone of (i) polymerized ethylenically unsaturated monomers and (ii) polymerized ethylenically unsaturated ester units that form ester groups, attached to the backbone, of the formula

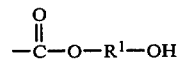

wherein $R^1$ is a saturated hydrocarbon radical having 2–10 carbon atoms and wherein the primary-hydroxyl content of the polymer is 0.5–4.4% by weight, based on the polymer, and;
 (c) 15–40% by weight, based on the weight of the blend, of an alkyd resin plasticizer which is the reaction product of a glyceride of a saturated fatty acid, a dihydric alcohol, and a derivative of a dicarboxylic acid selected from the group consisting of anhydrides, dialkyl esters, and mixtures of these, wherein the reaction product has a primary-hydroxyl content of 1.0–4.4% by weight, based on the reaction product, and wherein the coating composition is curable at ambient temperatures.

2. The coating composition of claim 1 in which the organic polyisocyanate is selected from the group consisting of aliphatic diisocyanates, cycloaliphatic diisocyanates, alkaryl diisocyanates, aralkyl diisocyanates, heterocyclic diisocyanates, and aryl diisocyanates.

3. The coating composition of claim 1 in which the organic polyisocyanate has the formula

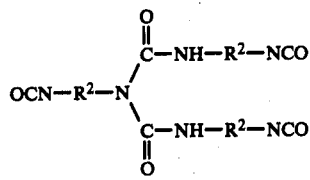

wherein $R^2$ is aromatic or an aliphatic hydrocarbon radical having 1-12 carbon atoms.

4. The coating composition of claim 3 in which the polymer (b) has a backbone of (i) polymerized monomers of an aromatic hydrocarbon having a vinylene group and an alkyl ester of an ethylenically unsaturated carboxylic acid and (ii) polymerized ester units wherein $R^1$ contains 2-4 carbon atoms and in which the dicarboxylic acid derivative is an anhydride.

5. The coating composition of claim 4 wherein the polymerized monomers (i) are styrene and an alkyl ester of acrylic acid, methacrylic acid, or mixtures of these.

6. The coating composition of claim 5 wherein the alkyl ester is methyl methacrylate, and wherein $R^1$ is ethylene.

7. The coating composition of claim 3, 4, 5, or 6 additionally containing 0.01-2.0% by weight, based on the weight of the polymer blend, of a curing catalyst.

8. The coating composition of claim 1, 2, 3, 4, 5 or 6 additionally containing pigment.

9. The coating composition of claim 1 wherein the polymerized monomers (i) are an aromatic hydrocarbon having a vinylene group and an alkyl ester of acrylic acid, methacrylic acid, or a mixture of these two and wherein the polymerized ester units (ii) are esters of acrylic or methacrylic acid wherein $R^1$ containing 2-4 carbon atoms.

10. The coating composition of claim 9 in which the organic polyisocyanate has the formula

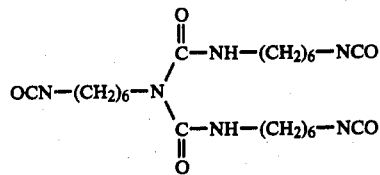

and in which the dicarboxylic acid derivative is an anhydride.

11. The coating composition of claim 10 in which the polymerized monomers (i) are styrene and methyl methacrylate, the polymerized ester units (ii) are hydroxyethyl acrylate, and the anhydride is phthalic anhydride.

12. The coating composition of claim 9, 10, or 11 additionally containing 0.01-2.0% by weight, based on the weight of the polymer blend, of an organo tin curing catalyst.

13. The coating composition of claim 9, 10, or 11 additionally containing pigment.

* * * * *